(12) United States Patent
Matsushima

(10) Patent No.: US 7,006,692 B2
(45) Date of Patent: *Feb. 28, 2006

(54) METHOD, APPARATUS AND COMPUTER PROGRAM PRODUCT FOR PROCESSING IMAGE DATA

(75) Inventor: Yuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/064,233

(22) Filed: Feb. 24, 2005

(65) Prior Publication Data

US 2005/0141763 A1    Jun. 30, 2005

Related U.S. Application Data

(63) Continuation of application No. 09/903,577, filed on Jul. 13, 2001, now Pat. No. 6,873,729.

(30) Foreign Application Priority Data

Jul. 14, 2000    (JP) .............................. 2000-214105

(51) Int. Cl.
*G06K 9/00* (2006.01)

(52) U.S. Cl. ..................... 382/168; 382/167; 382/172; 358/466; 358/522

(58) Field of Classification Search ................ 382/167, 382/168, 169, 170, 171, 172, 117; 358/521, 358/1.9, 519, 522, 3.27; 345/589, 597, 593, 345/600–602, 605, 690; 348/362, 221.1, 348/229.1, 222.1, 223.1, 355, 335

See application file for complete search history.

(56) References Cited

U.S. PATENT DOCUMENTS

| | | | | |
|---|---|---|---|---|
| 6,577,751 | B1 * | 6/2003 | Yamamoto | 382/117 |
| 6,694,051 | B1 * | 2/2004 | Yamazoe et al. | 382/167 |
| 6,888,529 | B1 * | 5/2005 | Bruning et al. | 345/102 |
| 2002/0122588 | A1 * | 9/2002 | Yamamoto | 382/167 |
| 2002/0171852 | A1 * | 11/2002 | Zhang et al. | 358/1.9 |
| 2003/0179398 | A1 * | 9/2003 | Takano et al. | 358/1.9 |
| 2004/0022434 | A1 * | 2/2004 | Yamazoe et al. | 382/168 |

FOREIGN PATENT DOCUMENTS

| | | |
|---|---|---|
| JP | 63184473 | 7/1988 |
| JP | 04168879 | 6/1992 |

* cited by examiner

*Primary Examiner*—Sanjiv Shah
*Assistant Examiner*—Ali Bayat
(74) *Attorney, Agent, or Firm*—Oblon, Spivak, McClelland, Maier & Neustadt, P.C.

(57) ABSTRACT

An image processing apparatus, method and computer program product, wherein a luminance histogram of input image data is generated by the histogram generating section and a polarization degree of the luminance histogram is evaluated by the polarization degree evaluating section in order to determine whether the input image data is in a true backlight condition or in a halation condition. An optimum dynamic range correction and tone curve correction are performed on the input image data based on a result of the above-described determination.

20 Claims, 9 Drawing Sheets

TYPICAL LUMINANCE HISTOGRAM OF
IMAGE DATA IN TRUE BACKLIGHT CONDITION

TYPICAL LUMINANCE HISTOGRAM OF
IMAGE DATA IN HALATION CONDITION

IN TRUE BACKLIGHT CONDITION

IN HALATION CONDITION

IN TRUE BACKLIGHT CONDITION

IN HALATION CONDITION

METHOD, APPARATUS AND COMPUTER PROGRAM PRODUCT FOR PROCESSING IMAGE DATA

CROSS-REFERENCE TO RELATED APPLICATIONS

The present application is a continuation of, and claims priority to, application Ser. No. 09/903,557, filed Jul. 13, 2001 now U.S. Pat. No. 6,873,729, which in turn claims priority to Japanese Application No. 2000-214105, filed Jul. 14, 2000. The contents of the above-identified applications are incorporated herein by reference.

BACKGROUND OF THE INVENTION

1. Field of the Invention

The present invention relates to an image data processing system, and more particularly, to a method, apparatus and computer program product for processing image data acquired by an image capturing device, such as a digital camera, etc.

2. Discussion of the Background

Japanese Patent Laid-Open Publication No. 4-168879 discloses an image forming apparatus in which the printing operation is performed based on a video signal. In the image forming apparatus, video signals are sampled and an image is determined to be overexposed when a number of samples, which have a value equal to a specified threshold value TH or greater, is equal to a predetermined value NH or greater. A tone conversion of the video signal is then performed using a suitable tone conversion curve. It is determined that the image is photographed with flash light when the number of samples, which have a value equal to a specified threshold value TL (<TH) or lower, is equal to a predetermined value NL or greater. The tone conversion of the video signal is performed using a suitable tone conversion curve.

Further, Japanese Patent Laid-Open Publication No. 63-184473 discloses an image forming apparatus in which the luminance histogram of image data is used to switch the tone correction table based on the luminance condition of the image data. Two histograms are generated i.e., one for a high luminance region and the other for a low luminance region, to reduce the memory capacity required for generating the histogram. An image capturing device, such as a digital camera, generally includes an automatic exposure control mechanism to obtain an optimum exposure. Generally, three systems are employed as the automatic exposure control mechanism, Namely, an average, center-weighted, and spot metering systems. In the average metering system, the amount of light is measured by dividing the image screen into multiple regions. The exposure is controlled based on a weighted average value of the amount of light of the divided regions. In the center-weighted metering system, the amount of light in the center region of the image screen is mainly measured. In the spot metering system, the exposure is controlled by measuring the amount of light in a local spot of the image screen.

A proper exposure adjustment may not be easily made even in an image capturing device having the above-described automatic exposure control mechanism when an image is photographed under backlight or partly under backlight conditions.

For example, in a true backlight condition in which the sun is located just behind a subject, the subject is darkened (i.e., underexposed) in the average or the center-weighted metering systems because the luminance difference between the background and the subject is substantial. The background part, e.g., the sky is whitened (i.e., overexposed). In the spot metering system, the exposure is controlled such that the subject is not underexposed in the true backlight condition. However, the background e.g., the sky is tends to be overexposed. Further, even in the spot metering system, the correct exposure for the subject is not always obtained under various photographing conditions because the position and the size of the photometry frame in the image screen are fixed.

A halation phenomenon in which light from the light source enters into the photographic lens also often occurs. The halation tends to occur frequently when a landscape is photographed in the morning or in the evening when the sun is low in the sky. In the halation condition, the subject itself is correctly exposed, although a part of the image is bleached-out, because the light source is not located immediately behind the subject.

SUMMARY OF THE INVENTION

The present invention has been made in view of the above-mentioned and other problems and addresses the above-discussed and other problems.

The present invention advantageously provides a novel image processing apparatus, method and computer program product, wherein image data acquired with an image capturing device, such as a digital camera, is properly determined whether the image data is in a true backlight or a halation conditions, and an appropriate process is performed on the image data in both the true backlight condition and the halation condition to improve quality of the image.

According to an example of the present invention, an image processing apparatus includes an image input device configured to input image data, an image condition determining device configured to determine whether the input image data input by the image input device is in a true backlight condition or in a halation condition, and a processing device configured to perform a specific process on the input image data based on the condition of the input image data determined by the image condition determining device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
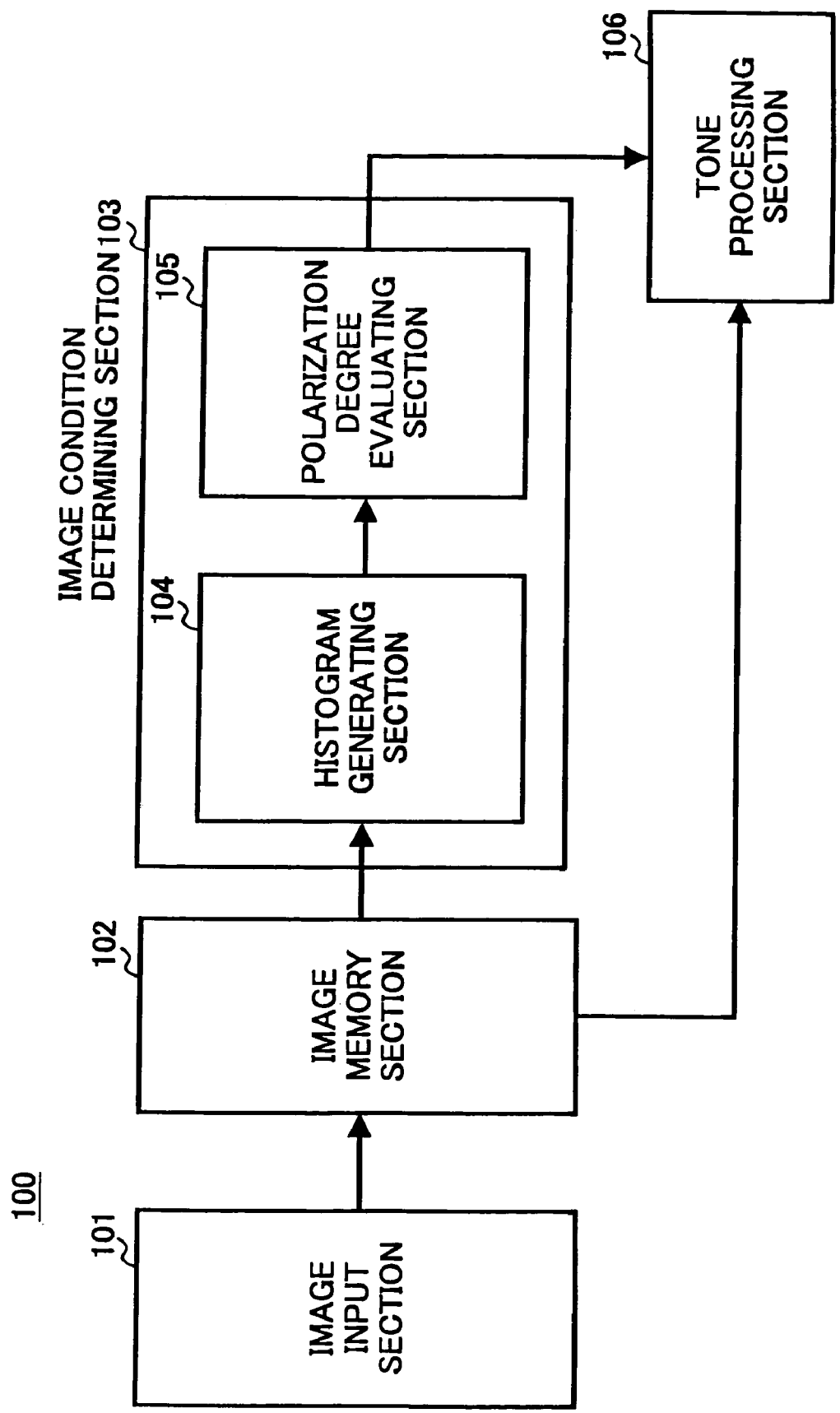
FIG. 1 is a block diagram illustrating an example of an image processing apparatus.

Referring now to the drawings, wherein like reference numerals designate identical or corresponding parts throughout the several views, FIG. 1 is a block diagram illustrating an example of an image processing apparatus. The image processing apparatus includes an image input section 101, an image memory section 102, an image condition determining section 103, and a tone processing section 106. The image input section 101 inputs image data. The image memory section 102 temporarily stores the input image data. The image condition determining section 103 receives the input image data from the image memory section 102 and determines the condition of the image. The tone processing section 106 receives the input image data from the image memory section 102 and performs a tone process on the image data based on the condition of the image data determined by the image condition determining section 103. The image condition determining section 103 includes a histogram generating section 104 and a polarization degree evaluation section 105.

Figure 2:
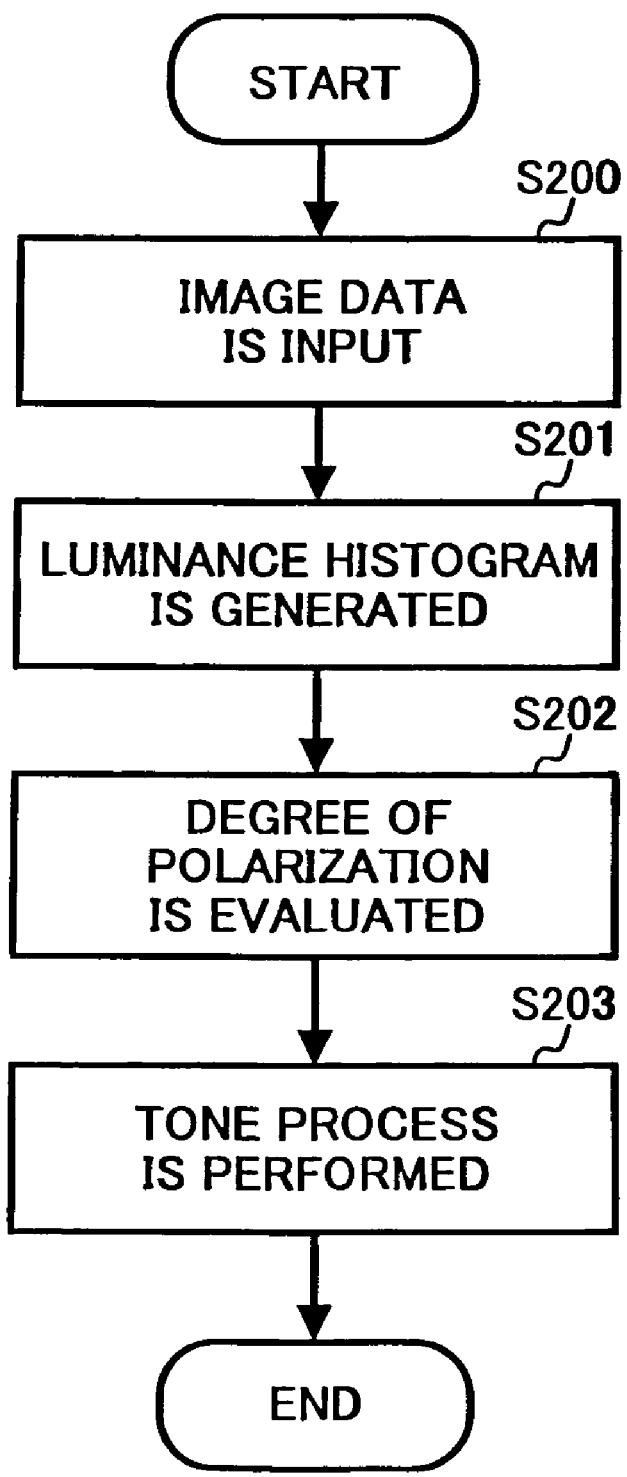
FIG. 2 is a flowchart illustrating the overall operation of the image processing apparatus.
Figure 3:
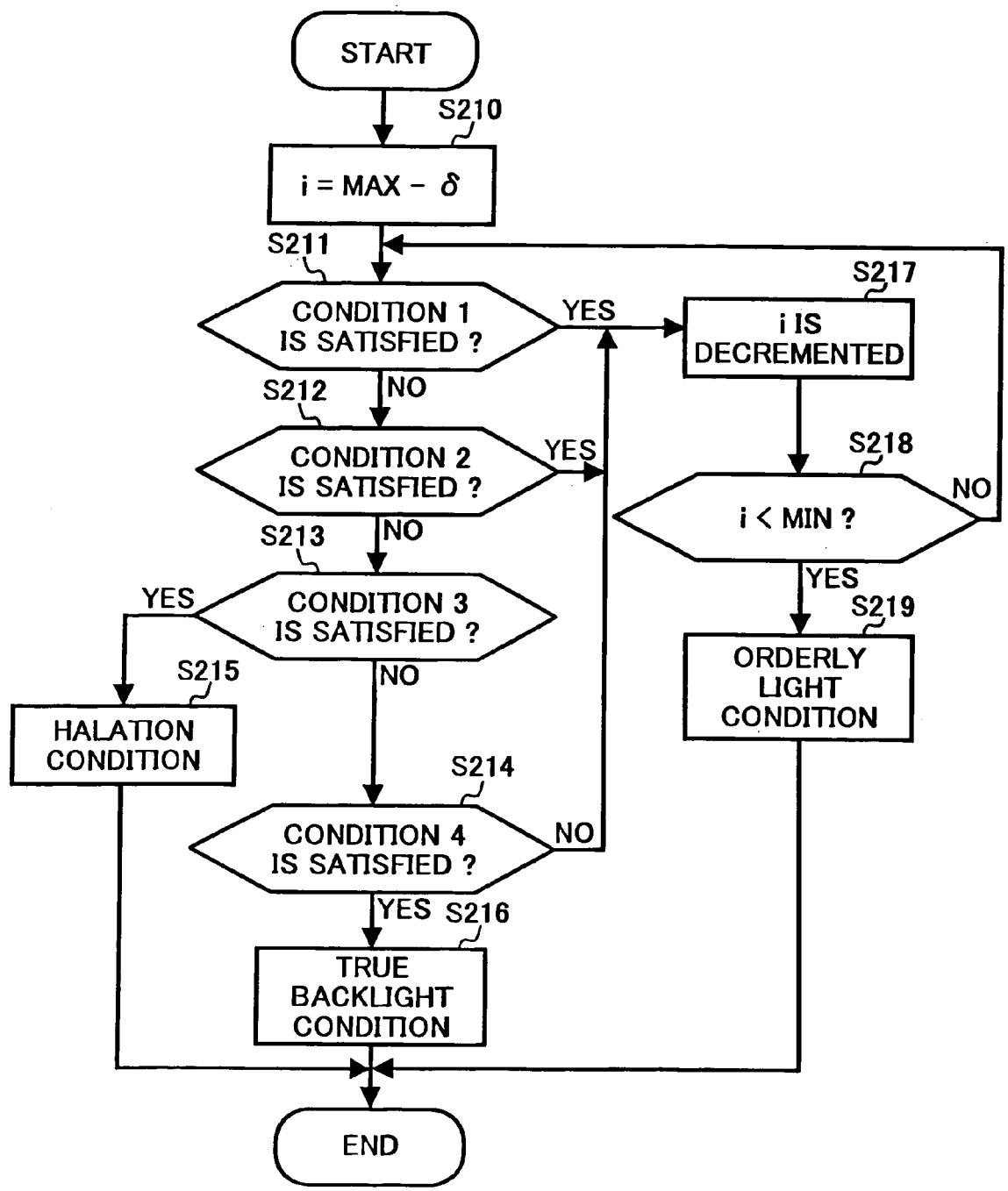
FIG. 3 is a flowchart illustrating an example of a process step for evaluating the polarization degree of a luminance histogram.

FIG. 2 is a flowchart illustrating an overall operation of an image processing apparatus 100. FIG. 3 is a flowchart illustrating an example of a process step performed by the polarization degree evaluating section 105 of the image condition determining section 103.

The overall operation of the image processing apparatus 100 is now described below referring to FIG. 2. The image input section 101 inputs image data and stores the input image data in the image memory section 102 at step 200. Herein, the input image data is assumed to be monochrome image data of 256 tones. More specifically, the image input section 101 inputs image data from, for example, (1) a digital camera, a personal computer, etc., via a universal serial bus (USB) cable, (2) a memory card or other recording media in which image data is stored, or (3) via a wire or radio network.

When image data is input, the histogram generating section 104 of the image condition determining section 103 inputs the input image data from the image memory section 102 and generates a luminance histogram, which shows the brightness of image data, at step 201. It is not necessarily required to use information of all of pixels of the input image data for generating the luminance histogram. The luminance histogram can be generated by sampling the input image data in a set sampling interval and using a part of the discrete pixel information.

Figure 4:
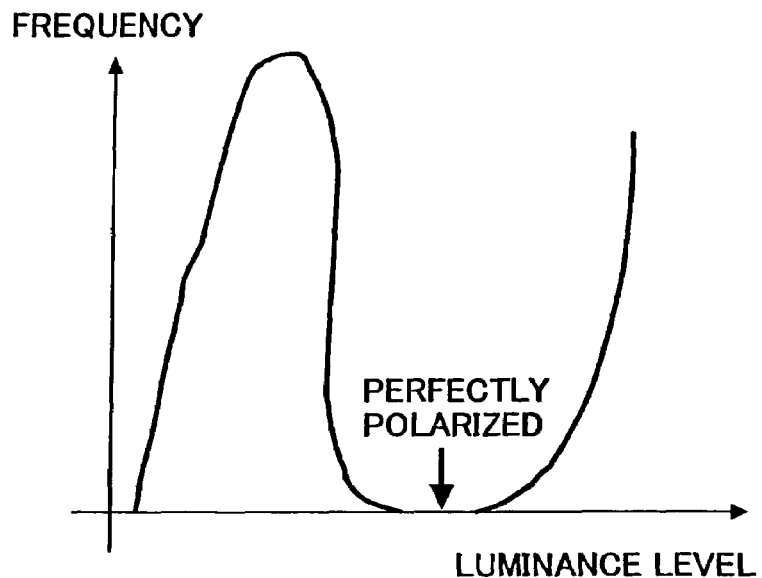
FIG. 4 illustrates a typical luminance histogram of image data in a true backlight condition.
Figure 5:
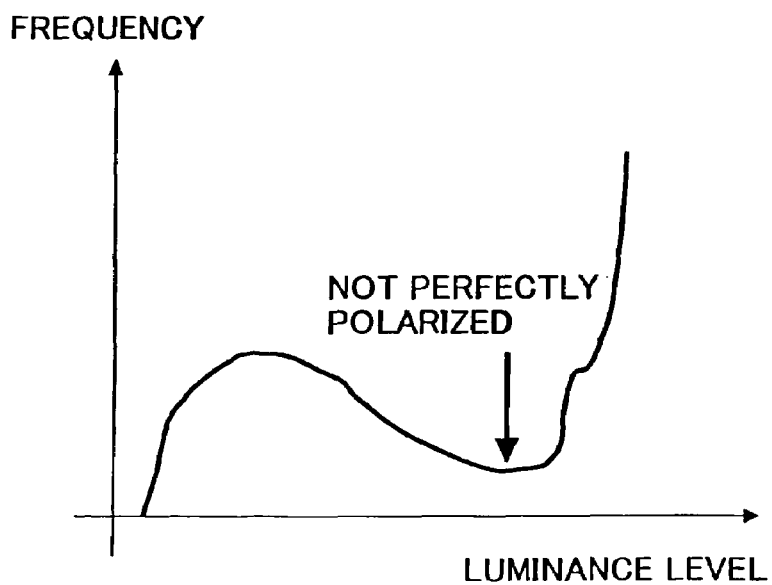
FIG. 5 illustrates a typical luminance histogram of image data in a halation condition.

The polarization degree evaluating section 105 evaluates the degree of a polarization of the luminance histogram generated by the histogram generating section 106 to determine the condition of an image of the input image data at step 202. FIG. 4 illustrates a typical luminance histogram of image data in a true backlight condition. FIG. 5 illustrates a typical luminance histogram of image data in a halation condition.

As is observed in FIGS. 4 and 5, the luminance histogram is polarized between in the high luminance region and in the low luminance region both in the halation condition and in the true backlight condition. However, in the true backlight condition, the luminance histogram is perfectly polarized such that the low luminance region separates from the high luminance region. The main information about a subject is included in the low luminance region. As is shown in FIG. 5, contrarily to the true backlight condition, the luminance histogram is not perfectly polarized in the halation condition such that the high luminance region and the low luminance region are completely separated. As described above, the degree of the polarization is remarkably high in the true backlight condition while the polarization degree is relatively low in the halation condition.

The polarization degree evaluating section 105 evaluates the degree of polarization of the luminance histogram and determines that the image data is in the true backlight condition when the luminance histogram is perfectly polarized as shown in FIG. 4. The polarization degree evaluating section 105 determines that the image data is in the halation condition when the luminance histogram is not perfectly polarized. When such a polarization of the luminance histogram is not recognized, the polarization degree evaluating section 105 determines that the image data is in the non-backlight condition (i.e., in the orderly light condition). More specific steps for evaluating the degree of the polarization will be described below referring to FIGS. 3 through 7.

The tone processing section 106 inputs input image data from the image memory section 102 and performs a tone process on the input image data suited for the condition of the image data determined by the image condition determining section 103 at step 203. The processed image data is then output. An example of the tone process performed on image data in the true backlight condition and in the halation condition is described below referring to FIGS. 8 through 10. A conventional tone process is performed on image data in an orderly light condition.

Specific steps for evaluating the degree of polarization are described below referring to the flowchart in FIG. 3, and FIGS. 6 and 7. In the steps, the degree of polarization is evaluated by using the frequency and the gradient of the luminance histogram.

Herein, the number of pixels and the level of luminance of an image to be determined by the image condition determining section 103 are described with "N" and "i" (=0, 1, 2, . . . 255), respectively. Further, the frequency and the gradient at the luminance level "i" are described with "f (i)" and "h (i)", respectively. This gradient h(i) is calculated in the following equation.

$$h(i)=(f(i+\delta)-f(i))/\delta (i=0,1,2, \ldots 255-\delta, \delta>0) \quad (1)$$

Threshold values of the absolute rate of frequency and the increase rate of the gradient are set as C (0<C<1) and D (0<D<1), respectively. The values of the absolute frequency threshold and the gradient increase threshold are set as described below.

The absolute frequency threshold value $$Th1=C \times N \quad (2)$$

The gradient increase threshold value $$Th2=f(i) \times D \quad (3)$$

Figure 6:
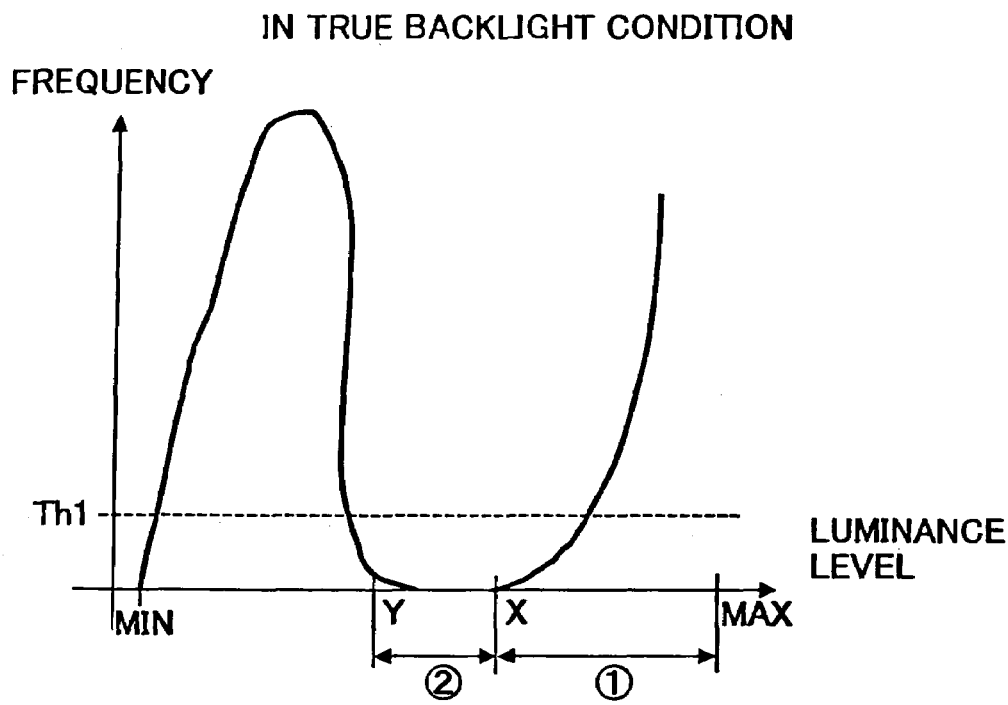
FIG. 6 is a diagram explaining the evaluation of the polarization degree of the luminance histogram.
Figure 7:
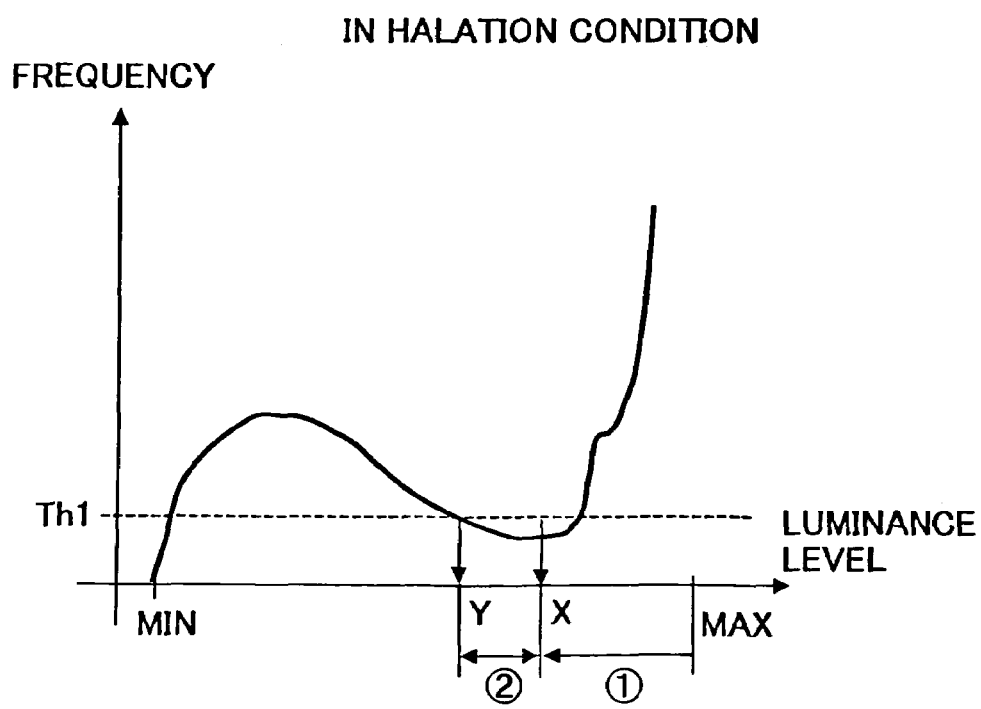
FIG. 7 is a diagram explaining the evaluation of the polarization degree of the luminance histogram.

The absolute frequency threshold value Th1 is indicated by the dotted line in FIGS. 6 and 7.

A luminance level "i", which is lower than the highest level of the luminance histogram MAX by "δ", is set at step 210.

At the luminance level "i", whether or not the condition 1 is satisfied is determined at step 211. The condition 1 means that the h(i) is more than zero (i.e., h(i)>0). Namely the gradient h(i) is positive. When the condition 1 is satisfied, the level of the luminance "i" is decremented by 1 at step 217. The process returns to step 211 to determine whether or not the condition 1 is satisfied when the luminance level "i", which has been decremented, is equal to the lowest level of the luminance histogram MIN or higher (i.e., No at step 218).

When the condition 1 is not satisfied at step 211, whether or not the condition 2 is satisfied is determined at step 212. The condition 2 means that h(i) is more than −Th2 (i.e., h(i)>−Th2) as well as f(i) is equal to or less than Th1 (i.e., f(i)≦Th1). When the condition 2 is satisfied, the luminance level "i" is decremented at step 217. The process then returns to step 211.

When the condition 2 is not satisfied at step 212, whether or not the condition 3 is satisfied is determined at step 213. The condition 3 means that f(i) is more than Th1 (i.e., f(i)>Th1). Namely, the frequency exceeds the absolute frequency threshold value Th1. When the condition 3 is satisfied, the image is determined to be in the halation condition at step 215. The process is then finished.

When the condition 3 is not satisfied at step 213, whether or not the condition 4 is satisfied is determined at step 214. The condition 4 means that h(i) is equal to or less than −Th2 (i.e., h(i)≦−Th2). When the condition 4 is satisfied, the image is determined to be in the true backlight condition at step 216. The process is then finished.

When the condition 4 is not satisfied at step 216, the luminance level "i" is decremented at step 217. The process then returns to step 211.

When neither of the conditions 3 and 4 are satisfied even when processes are repeated to the lowest luminance level (i.e., Yes at step 218), the image is determined not to be in the true backlight condition or in the halation condition, i.e., in the orderly light condition at step 219. The process is then finished.

The above-described steps are described below referring to FIGS. 6 and 7. In areas indicated by ① in FIGS. 6 and 7, the process proceeds to the lower luminance level because the gradient is positive and the condition 1 is satisfied.

At steps 212, 213, and 214, the relationship between the gradient increase threshold value and the absolute frequency threshold value after the first polarizing point (i.e., a point indicated by "X" in FIGS. 6 and 7) is examined.

In areas indicated by ② in FIGS. 6 and 7 where the frequency is low and the change in the frequency hardly occurs, the condition 2 is satisfied. The process then proceeds to a lower luminance level.

At the point Y indicated in FIG. 7 where the frequency is higher than the absolute frequency threshold value Th1, The condition 3 is satisfied and the image is determined to be in the halation condition.

The condition 4 is satisfied at the point Y indicated in FIG. 6 (i.e., a level of luminance where the frequency remarkably changes), and the image is determined to be in the true backlight condition.

According to an experiment, the image condition is satisfactory determined when values of δ, C and D are selected as, δ=15, C=0.001, and D=0.15. However, these values are just one of many examples. Since the evaluation of the quality of the image, which is printed or displayed after the image data is processed, differs according to the personal point of view of the observer, no absolute optimum value is available.

Figure 8:
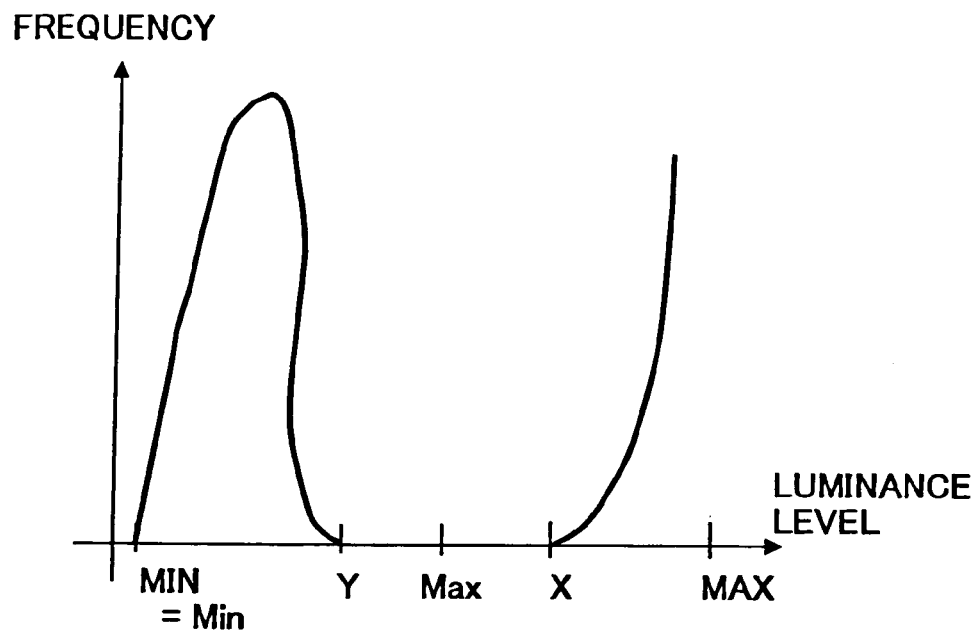
FIG. 8 is a diagram explaining the dynamic range correction performed on image data in the true backlight condition.
Figure 9:
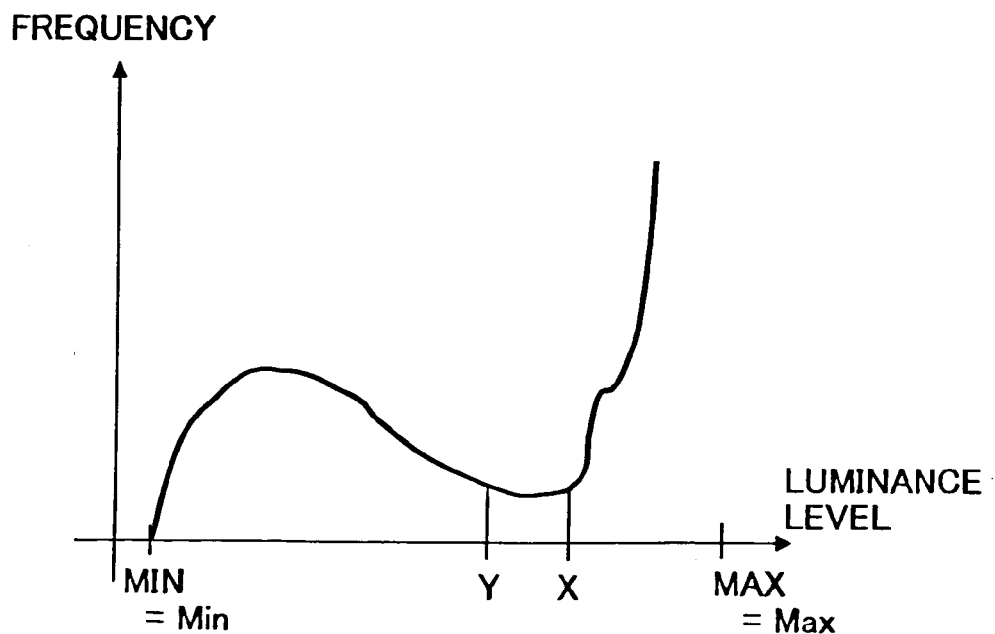
FIG. 9 is a diagram explaining the dynamic range correction performed on image data in the halation condition.
Figure 10:
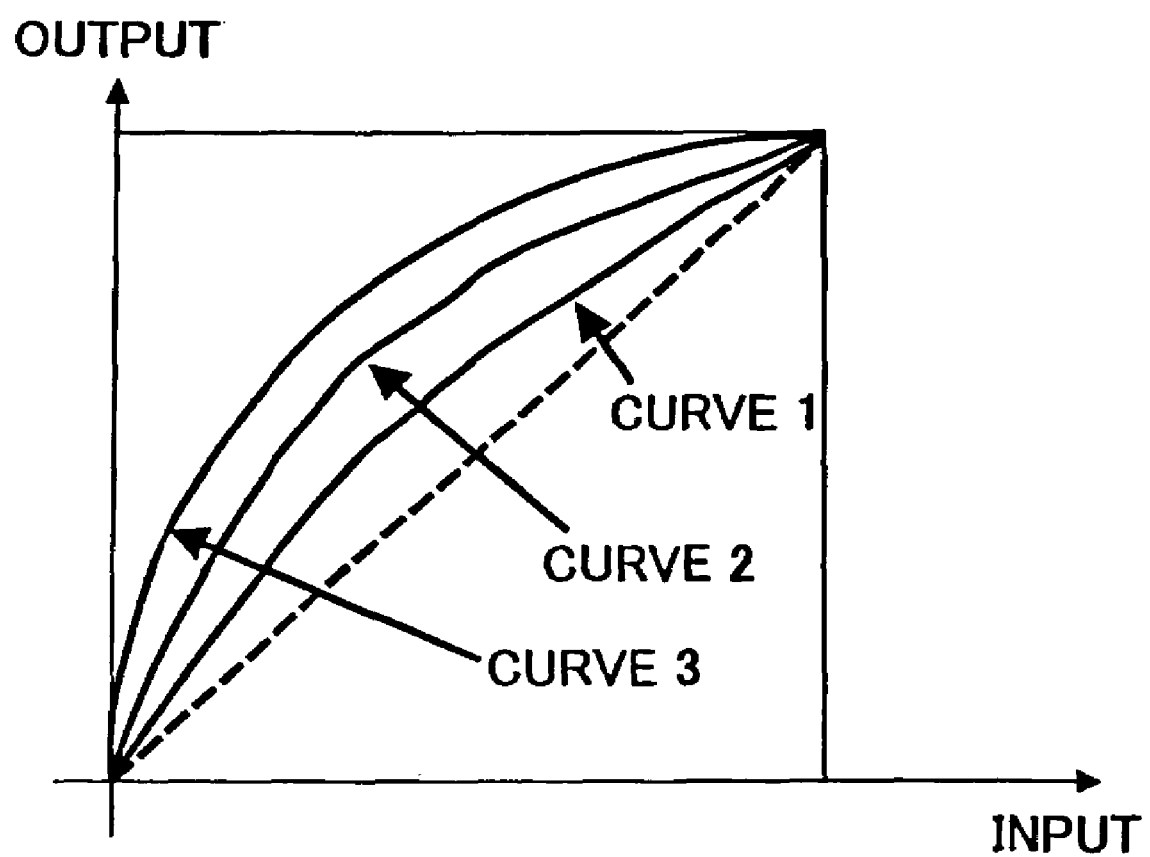
FIG. 10 is a diagram showing examples of tone curves.

Next, the tone process, which is performed by the tone processing section 106 on image data determined to be in the true backlight condition or in the halation condition, is now described referring to FIGS. 8 through 10. In FIGS. 8 and 9, MAX and MIN represent the highest and the lowest luminance level of the luminance histogram.

In the tone process, the dynamic range correction is performed based on the image condition. A tone curve correction is then performed on the image data, on which the dynamic range correction has been performed, based on the image condition. In the dynamic range correction process, the appropriate range to be corrected by the dynamic range correction is set for each image of in different type of conditions i.e., in the true backlight and the halation conditions. In the tone curve correction process, the value of the parameter for determining the proper exposure is obtained using data on a region other than the high luminance white light region of the luminance histogram. The optimum tone curve is determined based on the value obtained.

The dynamic range correction is described below. As described above, in the true backlight condition, the luminance histogram is perfectly polarized such that the low luminance region separates from the high luminance region. Main information about the subject is included in the low luminance region. Therefore, information about the high luminance region is not required. The maximum value of the luminance Max for the dynamic range correction is set such that the value satisfies the following condition instead of being set to the highest luminance level MAX of the luminance histogram (see FIG. 8).

$$Y \leq Max \leq X \quad (4)$$

Contrarily to the true backlight condition, the luminance histogram is not perfectly polarized in the halation condition such that the high luminance region and the low luminance region are completely separated. Therefore, the maximum value of the luminance MAX for the dynamic range correction is set to the highest luminance level MAX of the luminance histogram (see FIG. 9). That is, $$Max = MAX \quad (5)$$

The minimum value of the luminance Min for the dynamic range correction is set to the lowest luminance level MIN of the luminance histogram both in the true backlight condition and in the halation condition (see FIGS. 8 and 9). That is, $$Min = MIN \quad (6)$$

The value of input image data, i.e., an input value (i.e., 0~255) is converted by the following equation using the Max and Min values which are set as described above.

Output value=α×input value +β

α=255/(max−min)

$$\beta = -(255 \cdot min)/(max-min) \quad (7)$$

Thus, the dynamic range correction suitable for the image data either in the true backlight condition or in the halation condition is performed.

The tone curve correction is described below. It is assumed that the tone curve correction is performed by selecting an optimum tone curve from the prearranged plural types of tone curves as shown in FIG. 10, for example.

Since the image in the backlight condition includes high luminance white light as described above, the white light part ought to be removed to judge the exposure for the image. It is necessary to calculate the tone curve correction parameter based on data of the low luminance region for the image either in the true backlight condition or in the halation condition. That is, whether or not an exposure is correct is determined using the data between Min and Y in FIGS. 8 and 9. For example, the median value Mod is used as the determining parameter. However, since the dynamic range correction is performed based on the calculation (7), a median value Mod_after, which is calculated after the dynamic range correction is performed by the following equation, is used.

$$\text{Mod\_after} = \alpha \times \text{Mod} + \beta \qquad (8)$$

When Mod_after is equal to or less than 30 (i.e., Mod_after≦30), the tone curve 3 in FIG. 10 is selected. When Mod_after is more than 30 and is equal to or less than 60 (i.e., 30<Mod_after≦60), the tone curve 2 is selected. When Mod after is more than 60 (i.e., 60<Mod_after) in which the tone curve correction is not so much required, the tone curve 1 is selected. The tone curve correction is performed on image data, on which the dynamic range correction has been performed, using the tone curve selected as described above.

The parameter for determining the correct exposure is not limited to the median value. The tone curve correction may be performed in such a manner in which the proper tone curve is generated, or the standard tone curve is modified based on the value of the parameter for determining the correct exposure instead of selecting one of prearranged tone curves.

Although the description is made assuming that monochrome image data is input, a similar process can be performed on color image data. For example, the histogram generating section 104 calculates the luminance component from RGB (Red, Green, Blue) color image data and generates the luminance histogram based on the calculated luminance component, when the RGB color image data is input. More simply, the luminance histogram is generated using the G (green) component of the RGB color image data or using the component, which has a maximum luminance value out of the three components i.e., R (Red), G (Green) and B (Blue), as luminance information.

When the dynamic range correction is performed in the tone processing section 106, the dynamic range correction is performed, for example, based on the above-described equation (7) with respect to the G component. The dynamic range corrections on the R and B components are performed by multiplying values of the R and B components by a ratio of values of the G component between before and after the dynamic range correction is performed. In the tone curve correction process, the tone curve correction is performed, for example, on the G component using the selected tone curve. The tone curve corrections on the R and B components are performed by multiplying values of the R and B components by the ratio of values of the G component between before and after the dynamic range correction is performed.

The above-described image processing apparatus 100 can be accomplished using the hardware of a common computer which includes a processor, a memory, and so forth. In other words, the contents of the process of the image processing apparatus 100 can be handled on a computer. A program for handling the tasks is read into the computer from various types of recording media, such as a magnetic disk, an optical disk, a magneto-optical disk, a semiconductor memory element, and the like. The program may be read into the computer via a network. The read program is executed by a processor.

The above-described various types of recording media, in which the program is recorded, are also included in the present invention. The image condition determining section 103, which perform the method for determining the condition of an image according to the present invention, is included in the present invention. Further, various types of recording media, in which the program for causing a computer to perform the process of the method is recorded, are included in the present invention.

The image processing apparatus according to the present invention can be incorporated into an image forming apparatus, such as a printer, an image display apparatus, and an image capturing device, such as a digital camera. Those apparatuses and devices which include this image processing apparatus are included in the present invention. An example of an image forming apparatus is described below.

Figure 11:
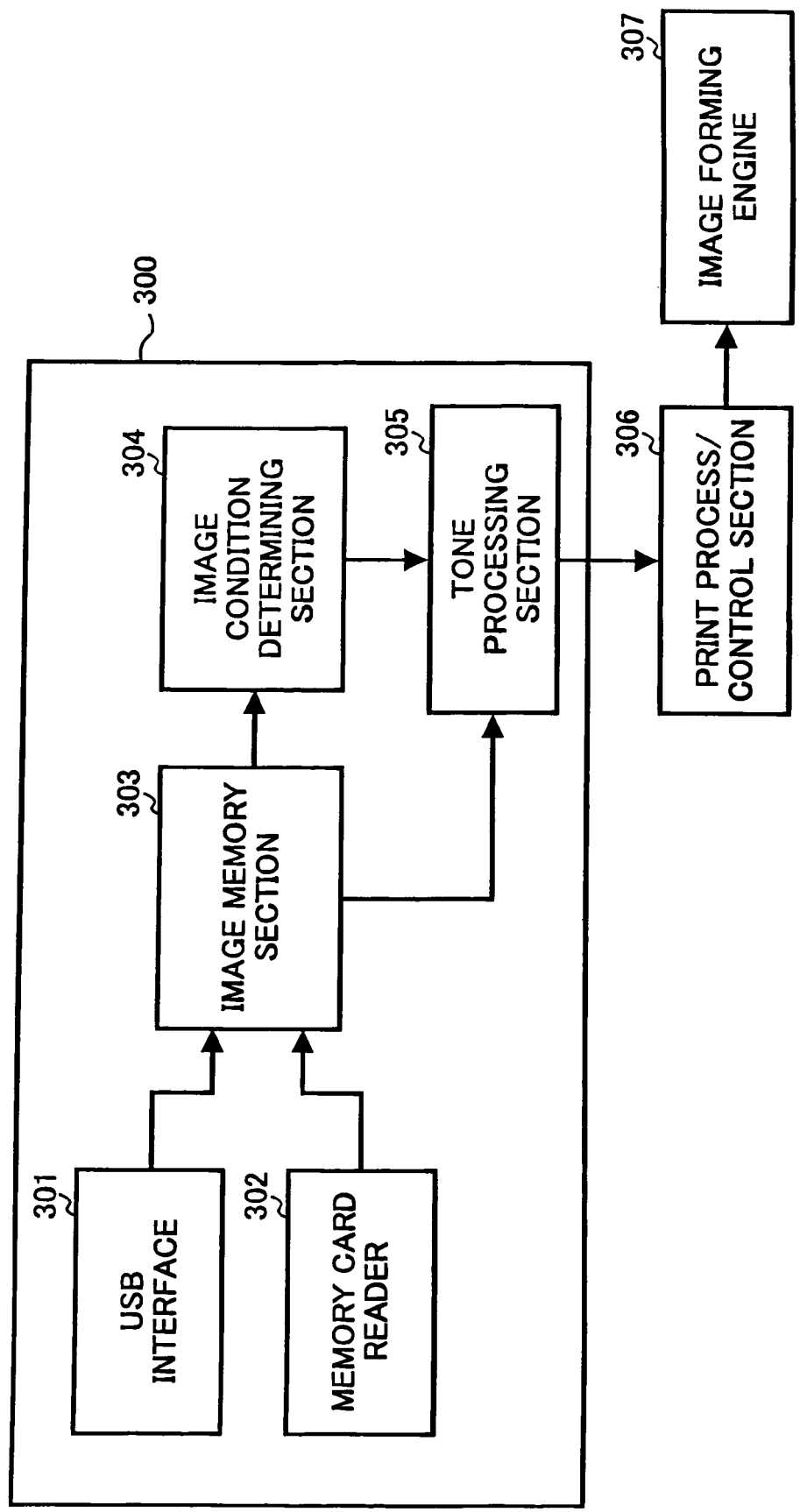
FIG. 11 is a block diagram illustrating a construction of a printer into which the image processing apparatus according to the present invention is incorporated.

FIG. 11 is a block diagram illustrating the construction of a printer into which an image processing apparatus according to the present invention is incorporated. The printer includes an image processing block 300, a print process/control section 306, and an image forming engine 307.

50 The image processing block 300 performs a similar process performed by the image processing apparatus 100 shown in FIG. 1. The image processing block 300 includes a USB interface 301, a memory card reader 302, an image memory section 303, an image condition determining section 304, and a tone processing section 305. The USB interface 301 and the image memory section 303 correspond to the image input section 101 and the image memory section 102 in FIG. 1, respectively. The image condition determining section 304 and the tone processing section 305 correspond to the image condition determining section 103 and the tone processing section 106 in FIG. 1, respectively.

Image data to be printed is input from a device, such as a digital camera, a personal computer etc., connected with the USB interface 301 via a USB cable, or is input from a memory card set in the memory card reader 302. The image data is temporarily stored in the image memory section 303. The input image data is read into the image condition determining section 304 in which the above-described image condition determining process is performed.

When the image condition determining process is finished, the input image data is read into the tone processing section 305 in which the above-described tone process according to an image condition is performed. The image data is then transmitted to the print process/control section 306. In print process/control section 306, a conversion (for example, a conversion from the RGB data to the CMYK (Cyan, Magenta, Yellow and Black) data) and the half tone process (for example, a dither process and an error diffusion process) are performed on the image data according to the imaging system and the characteristic of the image forming engine 307. A driving signal is supplied to the image forming engine 307 to form the image.

With this printer, quality of the image formed by the image forming engine 307 is improved even when image data in a true backlight condition or in a halation condition is input, because an appropriate dynamic range correction and tone curve correction are performed by the tone processing section 305 based on the condition of the image.

An image display apparatus, into which the image processing apparatus according to the present invention is incorporated, is accomplished, for example, by replacing the image forming engine 307 and the print process/control section 306 in FIG. 11 with the display and the display control section, respectively.

Figure 12:
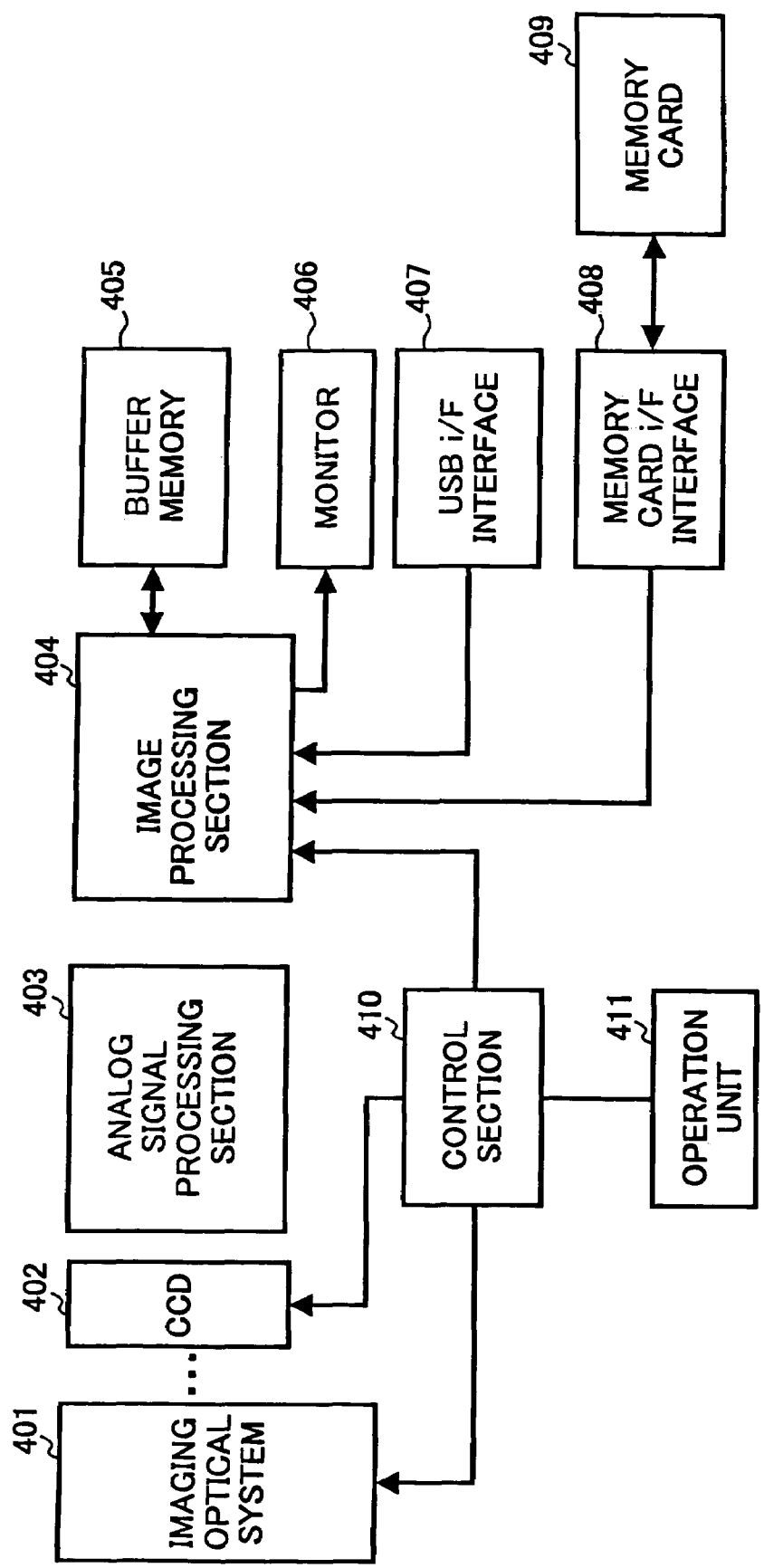
FIG. 12 is a block diagram illustrating the construction of an image capturing device into which the image processing apparatus according to the present invention is incorporated.

FIG. 12 is a block diagram illustrating the construction of an image capturing device, such as a digital camera into which an image processing apparatus according to the present invention is incorporated. The image capturing device includes an imaging optical system 401, a CCD (charge-coupled device) 402, and an analog signal processing section 403. The imaging optical system 401 includes an imaging lens and an aperture mechanism. The CCD 402 converts an optical image formed by the imaging optical system 401 into an analog image signal. The analog signal processing section 403 eliminates the noise in the analog image signal and adjusts the signal level of the analog image signal. The analog signal processing section 403 also converts the analog image signal into a digital signal. The image capturing device further includes an image processing section 404, a buffer memory 405, a monitor 406, a USB i/F interface 407, and a memory card i/F interface 408. The image processing section 404 includes a DSP (digital signal processor) for controlling a program. The buffer memory 405 is used by the image processing section 404. The monitor 406 includes a liquid crystal display panel. The USB i/F interface 407 is used for a connection with an external personal computer, etc. The memory card i/F interface 408 interfaces with a memory card 409 for writing and reading operation. The image capturing device also includes an operation unit 411 with which the user inputs various instructions, a control section 410 which controls the imaging optical system 401, the CCD 402, and the image processing section 404.

The image processing section 404 performs processes, such as (1) to generate monitor display data (i.e., so called through image data) from digital image data input from the analog signal processing section 403 and to display the monitor display data on the monitor 406, (2) to compress digital image data, which is input from the analog signal processing section 403, based on the depression of the release button of the operation unit 411, and write the compressed image data into the memory card 409, (3) to read the compressed image data from the memory card 409 and decompress the image data to display it on the monitor 406.

When the instruction to perform the backlight correction process is given by the operation unit 411, the image processing section 404 reads the compressed image data from the memory card 403 and decompresses the read image data in the buffer memory 405. The image processing section 404 then performs an image condition determining process on the decompressed image data similar to that performed by the image condition determining section 103 in FIG. 1. The image processing section 404 further performs a tone process similar to that performed by the tone processing section 106 in FIG. 1 according to the result of the determination.

Further, the image processing section 404 displays the processed image data on the monitor 406 and write the image data into the memory card 409 by compressing the image data when an instruction is given from the operation unit 411. That is, the image processing section 404 acts as the image input section 101, the image condition determining section 103, and the tone processing section 106 in FIG. 1, when the instruction to perform the backlight correction process is provided. In other words, processes performed by the image input section 101, the image condition determining section 103, and the tone processing section 106 are performed by the image processing section 404 by the program. In this case, the buffer memory 405 corresponds to the image memory section 102 in FIG. 1.

Numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2000-214105, filed on Jul. 14, 2000, and the entire contents thereof are herein incorporated by reference.

What is claimed as new and is desired to be secured by Letters Patent of the United States is:

1. An image processing apparatus, comprising:
   an image input device configured to input image data;
   an image condition determining device configured to determine whether the input image data input by the image input device is in a true backlight condition; and
   a tone processing device configured to perform a tone process on the input image data based on the determination made by the image condition determining device,
   wherein the image condition determining device comprises:
   a histogram generating device configured to generate a luminance histogram of image data based on the input image data;
   a polarization degree evaluating device configured to evaluate a polarization degree of the luminance histogram, and
   wherein the image condition determining device is configured to determine that the input image data is in the true backlight condition when the luminance histogram is perfectly polarized, and that the input image data is in a backlight condition, other than the true backlight condition, when the luminance histogram is not perfectly polarized.

2. The image processing apparatus according to claim 1, wherein the image condition determining device is configured to evaluate the polarization degree of the luminance histogram using frequency and gradient values of the luminance histogram.

3. The image processing apparatus according to claim 2, wherein the tone processing device is configured to perform dynamic range correction and tone curve correction on the input image data based on the determination made by the image condition determining device.

4. The image processing apparatus according to claim 1, wherein the tone processing device is configured to perform a dynamic range correction and a tone curve correction on the input image data based on the determination made by the image condition determining device.

5. The image processing apparatus according to claim 1, wherein wherein the tone processing device is configured to perform dynamic range correction and tone curve correction on the input image data based on the determination made by the image condition determining device.

6. An image processing method, comprising:
   inputting image data;
   determining whether the input image data is in a true backlight condition; and
   performing a tone process on the input image data based on the determination made in the determining step, wherein the determining step comprises:
generating a luminance histogram of image data based on the input image data; and
evaluating a polarization degree of the luminance histogram,
wherein the determining step comprises determining that the input image data is in the true backlight condition when the luminance histogram is perfectly polarized, and that the input image data is in a backlight condition other than the true backlight condition when the luminance histogram is not perfectly polarized.

7. The method of claim 6, wherein the determining step comprises:
evaluating the polarization degree of the luminance histogram using frequency and gradient values of the luminance histogram.

8. The method of claim 7, wherein the performing step comprises:
performing dynamic range correction and tone curve correction on the input image data based on the determination made in the determining step.

9. The method of claim 6, wherein the performing step comprises:
performing dynamic range correction and tone curve correction on the input image data based on the determination made in the determining step.

10. The method of claim 6, wherein the performing step comprises:
performing dynamic range correction and tone curve correction on the input image data based on the determination made in the determining step.

11. An image processing apparatus, comprising:
means for inputting image data;
means for determining whether or not the input image data input by the means for inputting is in a true backlight condition; and
means for performing a tone process on the input image data based on the determination made by the means for determining,
wherein the means for determining comprises:
means for generating a luminance histogram of image data based on the input image data; and
means for evaluating a polarization degree of the luminance histogram, and
wherein the means for determining comprises means for determining that the input image data is in the true backlight condition when the luminance histogram is perfectly polarized, and that the input image data is in a backlight condition, other than the true backlight condition, when the luminance histogram is not perfectly polarized.

12. The image processing apparatus according to claim 11, wherein the means for determining comprises:
means for evaluating the polarization degree of the luminance histogram using frequency and gradient values of the luminance histogram.

13. The image processing apparatus according to claim 12, wherein the means for performing comprises:
means for performing dynamic range correction and tone curve correction on the input image data based on the determination made by the means for determining.

14. The image processing apparatus according to claim 11, wherein the means for performing comprises:
means for performing dynamic range correction and tone curve correction on the input image data based on the determination made by the means for determining.

15. The image processing apparatus according to claim 11, wherein means for performing comprises:
means for performing dynamic range correction and tone curve correction on the input image data based on the determination made by the means for determining.

16. An image processing method, comprising:
inputting image data;
determining whether the input image data is in a true backlight condition; and
performing a tone process on the input image data based on the determination made in the determining step,
wherein the determining step comprises:
generating a luminance histogram of image data based on the input image data; and
evaluating a polarization degree of the luminance histogram,
wherein the determining step comprises determining that the input image data is in the true backlight condition when the luminance histogram is perfectly polarized, and that the input image data is in a backlight condition other than the true backlight condition when the luminance histogram is not perfectly polarized.

17. The method of claim 16, wherein the determining step comprises:
evaluating the polarization degree of the luminance histogram using frequency and gradient values of the luminance histogram.

18. The method of claim 17, wherein the performing step comprises:
performing dynamic range correction and tone curve correction on the input image data based on the determination made in the determining step.

19. The method of claim 16, wherein the performing step comprises:
performing dynamic range correction and tone curve correction on the input image data based on the determination made in the determining step.

20. The method of claim 16, wherein the performing step comprises:
performing dynamic range correction and tone curve correction on the input image data based on the determination made in the determining step.

* * * * *